US009406230B2

(12) United States Patent
Kuroba et al.

(10) Patent No.: US 9,406,230 B2
(45) Date of Patent: Aug. 2, 2016

(54) DRIVE CONTROL APPARATUS

(75) Inventors: Yoshiyuki Kuroba, Nishishirakawa-gun (JP); Hideaki Nara, Shimotsuke (JP); Kenji Kodaka, Zama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1 day.

(21) Appl. No.: 14/116,967

(22) PCT Filed: May 15, 2012

(86) PCT No.: PCT/JP2012/062384

§ 371 (c)(1), (2), (4) Date: Nov. 11, 2013

(87) PCT Pub. No.: WO2012/157633

PCT Pub. Date: Nov. 22, 2012

(65) Prior Publication Data

US 2014/0104050 A1 Apr. 17, 2014

(30) Foreign Application Priority Data

May 18, 2011 (JP) ................................ 2011-111354

(51) Int. Cl.
*B60Q 1/00* (2006.01)
*G08G 1/16* (2006.01)

(52) U.S. Cl.
CPC . *G08G 1/16* (2013.01); *G08G 1/166* (2013.01)

(58) Field of Classification Search
CPC ............ B60W 30/08; B60Q 1/00; G08G 1/16
USPC .................................................. 340/903, 435
See application file for complete search history.

(56) References Cited

U.S. PATENT DOCUMENTS 5,235,316 A * 8/1993 Qualizza ....................... 340/436
5,684,473 A * 11/1997 Hibino et al. ................ 340/903

(Continued)

FOREIGN PATENT DOCUMENTS

CN 1745316 A 3/2006
CN 101169480 A 4/2008

(Continued)

OTHER PUBLICATIONS

International Search Report dated Jun. 12, 2012, issued in corresponding application No. PCT/JP2012/062384.

(Continued)

*Primary Examiner* — Brent Swarthout
(74) *Attorney, Agent, or Firm* — Westerman, Hattori, Daniels & Adrian, LLP

(57) ABSTRACT

This drive control apparatus, includes: a traveling speed detection portion that detects a traveling speed of an own vehicle; an object detection portion that detects an object around an own vehicle and obtains an object detection result; a time-to-collision calculation portion that calculates time to when the object and the own vehicle collide against each other based on the traveling speed and the object detection result; and an alarm portion that raises an alarm to a driver based on the time to collision, in which the alarm portion: obtains reference alarm start time that is preset as a reference value for starting the alarm, and a predetermined distance that is preset as a minimum value of an error in distance perception of the driver; adds time obtained by dividing the predetermined distance by the traveling speed and raises the alarm to the driver.

12 Claims, 8 Drawing Sheets

(56) References Cited

U.S. PATENT DOCUMENTS

| | | | | |
|---|---|---|---|---|
| 5,699,040 | A * | 12/1997 | Matsuda | 340/435 |
| 8,260,538 | B2 * | 9/2012 | Noda et al. | 701/301 |
| 2006/0077050 | A1 | 4/2006 | Takahashi | |
| 2006/0190175 | A1 | 8/2006 | Moriizumi et al. | |
| 2012/0116663 | A1 | 5/2012 | Tsunekawa | |

FOREIGN PATENT DOCUMENTS

| | | | |
|---|---|---|---|
| DE | 102007050962 | A1 | 4/2009 |
| DE | 112009001364 | T5 | 5/2011 |
| JP | 07-159525 | A | 6/1995 |
| JP | 08-132931 | A | 5/1996 |
| JP | 2003-025937 | A | 1/2003 |
| JP | 2005-149024 | A | 6/2005 |
| JP | 2005-280398 | A | 10/2005 |
| JP | 2007-304815 | A | 11/2007 |
| JP | 2009-146029 | A | 7/2009 |
| JP | 2011-022990 | A | 2/2011 |
| JP | 2011-237871 | A | 11/2011 |
| WO | 2010/119860 | A1 | 10/2010 |

OTHER PUBLICATIONS

Japanese Office Action dated Apr. 1, 2014, issued in Japanese Patent Application No. 2013-515159 with English translation (4 pages).

Office Action dated Jan. 30, 2015, issued in corresponding Chinese Application No. 201280023300.0, w/English translation of Search Report. (9 pages).

Extended European Search Report dated Dec. 19, 2014, issued in European Application No. 12785627.6. (6 pages).

* cited by examiner

DRIVE CONTROL APPARATUS

TECHNICAL FIELD

The present invention relates to a drive control apparatus.

Priority is claimed on Japanese Patent Application No. 2011-111354, filed on May 18, 2011, the content of which is incorporated herein by reference.

BACKGROUND ART

In conventional systems that raise an alarm to prevent collision or use an automatic brake to lessen damage from collision or to perform an operation of avoiding collision, the timing for an average driver to perform an deceleration operation is set to coincide with the timing at which the alarm is activated (for example, see Patent Document 1 below). This is to prevent the driver from feeling that the timing of alarm activation is annoying.

PRIOR ART DOCUMENT

Patent Document

Patent Document 1: Japanese Unexamined Patent Application, First Publication No. 2009-146029

SUMMARY OF INVENTION

Problems to be Solved by the Invention

However, in the conventional drive control apparatus as described above, for example in a case where the vehicle is moving at an extremely low speed range and an obstacle is not moving, an error in distance perception of the driver occurs that the driver feels that the obstacle is closer than it actually is and then this may lead to a problem in that there are cases where it is not possible to activate the alarm at the proper timing for the driver although the timing of alarm is set to fixed time.

The error in distance perception is due to the following. At the extremely low speed range, the distance from the vehicle to the obstacle can be close, and thus, this makes the feeling of pressure from the obstacle becomes stronger, causing the driver to feel that the obstacle is closer than it actually is.

The present invention has been achieved in view of the above problem. An object of the present invention is to provide a drive control apparatus capable of activating an alarm even if an error occurs in distance perception of the driver.

Means for Solving the Problem (1) To solve the above problem, a drive control apparatus according to an aspect of the present invention includes: a traveling speed detection portion that detects a traveling speed of an own vehicle; an object detection portion that detects an object around an own vehicle and obtains an object detection result; a time-to-collision calculation portion that calculates the time to when the object and the own vehicle collide against each other based on the traveling speed and the object detection result; and an alarm portion that raises an alarm to a driver based on the time to collision, in which the alarm portion: obtains reference alarm start time that is preset as a reference value for starting the alarm, and a predetermined distance that is preset as a minimum value of an error in distance perception of the driver; adds time obtained by dividing the predetermined distance by the traveling speed to the reference alarm start time to find an alarm activation start threshold time; and raises the alarm to the driver based on the alarm activation start threshold time and on the time to collision.

(2) In the drive control apparatus as set forth above in (1), only at an extremely low vehicle speed, the alarm portion may raise the alarm to the driver based on the alarm activation start threshold time.

(3) A drive control apparatus according to another aspect of the present invention includes: a traveling speed detection portion that detects a traveling speed of an own vehicle; an object detection portion that detects an object around an own vehicle and obtains an object detection result; a distance-to-collision calculation portion that calculates a distance for the object and the own vehicle to collide against each other based on the traveling speed and the object detection result; and an alarm portion that raises an alarm to a driver based on the distance to collision, in which the alarm portion: obtains a reference alarm start distance that is preset as a reference value for starting the alarm, and a predetermined distance that is preset as a minimum value of an error in distance perception of the driver; adds the predetermined distance to the reference alarm start distance to find an alarm activation start threshold distance; and raises the alarm to the driver based on the alarm activation start threshold distance and on the distance to collision.

(4) In the drive control apparatus as set forth above in (3), only at an extremely low vehicle speed, the alarm portion may raise the alarm to the driver based on the alarm activation start threshold distance.

(5) A drive control apparatus according to another aspect of the present invention includes: a traveling speed detection portion that detects a traveling speed of an own vehicle; an object detection portion that detects an object around an own vehicle and obtains an object detection result; a relative speed detection portion that detects a relative speed between an own vehicle and an object; a distance-to-collision calculation portion that calculates a distance for the object and the own vehicle to collide against each other based on the traveling speed and the object detection result; and an alarm portion that raises an alarm to a driver based on the distance to collision, in which the alarm portion: obtains reference alarm start time that is preset as a reference value for starting the alarm, and a predetermined distance that is preset as a minimum value of an error in distance perception of the driver; adds time obtained by dividing the predetermined distance by a relative speed between the own vehicle and the object to the reference alarm start time to find alarm activation start threshold time; and raises the alarm to the driver based on the alarm activation start threshold time and on the time to collision.

(6) In the drive control apparatus as set forth above in (5), only when the relative speed is extremely low, the alarm portion may raise the alarm based on the alarm activation start threshold time.

Advantageous Effects of the Invention

According to the aspect as described above in (1), compared with the case where the speed of the own vehicle is high, the lower the speed of the own vehicle is, the longer the alarm activation start threshold time is, and the earlier the timing of starting the alarm is. Therefore, at the proper timing in accordance with the error in distance perception of the driver, it is possible to activate an alarm, to thereby improve the merchantability.

According to the aspect as described above in (2), at an extremely low vehicle speed where an error in distance perception of the driver is especially large, it is possible to activate an alarm at the proper timing.

According to the aspect as described above in (3), even if an error is likely to occur in distance perception of the driver with the traveling speed of the own vehicle being low and also the distance to collision being extremely short, it is possible to make the alarm activation start threshold distance longer by a predetermined distance. Therefore, at the proper timing in accordance with the error in distance perception of the driver, it is possible to activate an alarm, to thereby improve the merchantability.

According to the aspect as described above in (4), the advantageous effect as described above in (3) is obtained. In addition, at an extremely low vehicle speed where an error in distance perception of the driver is especially large, it is possible to activate an alarm at the proper timing.

According to the aspect as described above in (5), compared with the case where the relative speed between the own vehicle and the object is high, the lower the relative speed between the own vehicle and the object is, the longer the alarm activation start threshold time is, and the earlier the timing of starting the alarm is. Therefore, even if the traveling own vehicle is going to approach the object that is moving at the same speed as that of the own vehicle, it is possible to activate an alarm at the proper timing in accordance with the error in distance perception of the driver.

According to the aspect as described above in (6), the advantageous effect as described above in (5) is obtained. In addition, when the relative speed between the own vehicle and the object is extremely low where an error in distance perception of the driver is especially large, it is possible to activate an alarm at the proper timing.

DESCRIPTION OF EMBODIMENTS

Next is a description of a drive control apparatus according to an embodiment of the present invention, with reference to the drawings.

Figure 1:
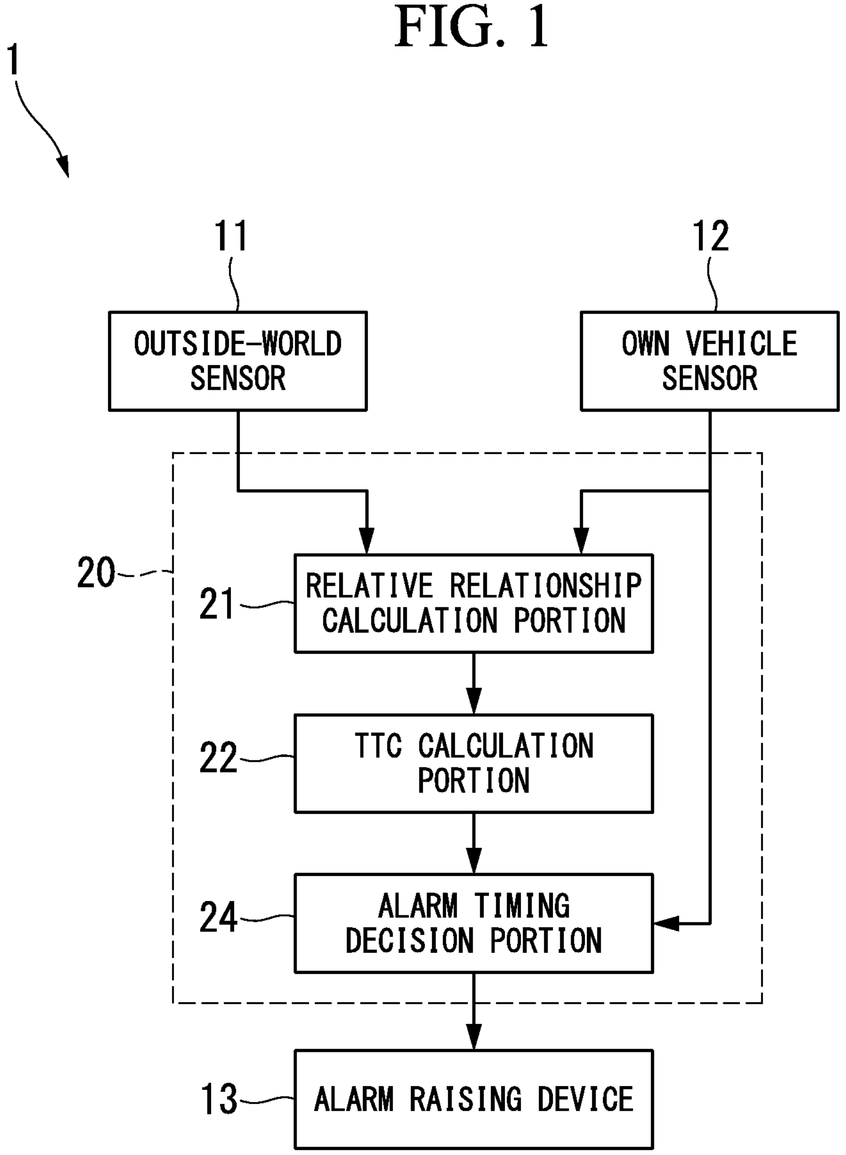
FIG. 1 is a block diagram showing a schematic structure of a drive control apparatus according to a first embodiment of the present invention.

As shown in FIG. 1, a drive control apparatus 1 according to this embodiment includes: an outside-world sensor (object detection portion) 11; an own vehicle sensor (traveling speed detection portion) 12; an alarm raising device 13; and an electronic control device 20.

As the outside-world sensor 11, for example a millimeter-wave-band radar device, a laser radar device that uses a wavelength band near the infrared light band, or an image recognition device that uses one or more camera devices, or a combination of these may be used. The outside-world sensor 11 detects object information (position, speed, direction of travel, size, and the like) around the own vehicle at predetermined intervals (for example, 100 msec). Furthermore, the outside-world sensor 11 outputs the detection results to the electronic control device 20.

The own vehicle sensor 12 has sensors that detect information on the own vehicle such as, for example, its speed, amount of steering, accelerator position angle, ON/OFF of the brake pedal switch, and ON/OFF of the blinker switch. The own vehicle sensor 12 outputs the detection results of the sensors to the electronic control device 20. Based on the amount of steering, it is possible to estimate a yaw rate that is to be produced in the own vehicle. Furthermore, based on the accelerator opening or the ON/OFF of the brake pedal switch, it is possible to estimate the acceleration and deceleration that are to be generated in the own vehicle. These pieces of information on the own vehicle may be detected directly from the sensors and may also be obtained via the respective ECU's or in-vehicle LAN mounted in the own vehicle.

The alarm raising device 13 is a device that raises an alarm to passengers (especially, the driver) of the own vehicle. Devices usable as the alarm raising device 13 include, for example: a buzzer or a speaker that raises a warning sound or a synthesized voice in response to a control signal that has been output from the electronic control device 20; and a display device that displays a warning in response to the control signal. The alarm raising device 13 raises an alarm, to thereby prompt the driver of the own vehicle for an action of avoiding contact.

Based on the various information on the preceding vehicle that have been input from the outside-world sensor 11 and on the various information on the own vehicle that have been input from the own vehicle sensor 12, the electronic control device 20 calculates the time to when the own vehicle and the preceding vehicle are brought into contact with each other. Based on this result, the electronic control device 20 decides the timing of raising an alarm, and determines whether or not it is necessary to raise an alarm to the passenger(s) of the own vehicle. If having determined that it is necessary to raise an alarm, the electronic control device 20 outputs an alarm command to the alarm raising device 13.

The electronic control device 20 includes, for example: a relative relationship calculation portion 21; a TTC calculation portion (a time-to-collision calculation portion) 22; and an alarm timing decision portion (an alarm portion) 24.

Based, for example, on the information on the preceding vehicle (position, speed, direction of travel, and size) that has been input from the outside-world sensor 11 and on the information on the own vehicle (position, speed, and direction of travel) that has been input from the own vehicle sensor 12, the relative relationship calculation portion 21 predicts the courses of the own vehicle and the preceding vehicle, and also calculates the relative distance and relative speed between the own vehicle and the preceding vehicle. The relative relationship calculation portion 21 then outputs the results to the TTC calculation portion 22.

Based, for example, on the predicted courses of the own vehicle and the preceding vehicle and the relative distance and the relative speed between the own vehicle and the preceding vehicle that have been input from the relative relationship calculation portion 21, the TTC calculation portion 22 determines whether the own vehicle and the preceding vehicle are likely to contact each other or not. If the vehicles are likely to contact each other, the TTC calculation portion 22 calculates the time to contact (namely, time to collision TTC), and outputs it to the alarm timing decision portion 24.

Based, for example, on the time to collision TTC that has been input from the TTC calculation portion 22, on the vehicle speed of the own vehicle that has been input from the own vehicle sensor 12, and on the preset reference alarm start time, the alarm timing decision portion 24 decides the timing of raising an alarm, and outputs it to the alarm raising device 13.

Figure 2:
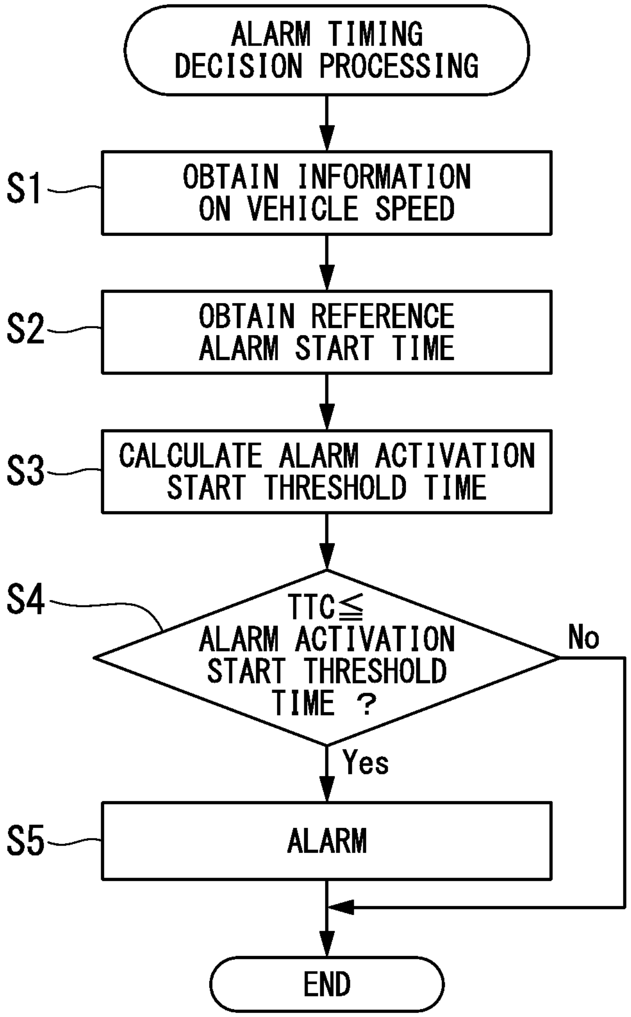
FIG. 2 is a flow chart of alarm timing decision processing of the drive control apparatus.

Next is a description of the alarm timing decision processing performed by the alarm timing decision portion 24 for deciding the timing of raising an alarm, with reference to the flow chart of FIG. 2.

Firstly, in step S1, the information on the vehicle speed is obtained from the own vehicle sensor.

Next, in step S2, the information on reference alarm start time that is previously stored in a storage device such as memory (not shown in the figure) is read and obtained. The reference alarm start time is reference time for calculating alarm activation start threshold time (alarm activation time), which is a threshold value of the time to collision TTC. The reference alarm start time is set to a period of time (for example, approximately 1.2 seconds) in accordance with various conditions such as the vehicle type of the own vehicle.

Next, in step S3, the alarm activation start threshold time is calculated based on the information on the vehicle speed and on the information on the reference alarm start time. To be more specific, a value (s) obtained by dividing a preset predetermined distance (m) (for example, 0.5 m) by a traveling speed (m/s) is added to the reference alarm start time to calculate the alarm activation start threshold time, as shown in formula (1) below.

Alarm Activation Start Threshold Time=Reference Alarm Start Time+Predetermined Distance/Traveling Speed (1)

Figure 3:
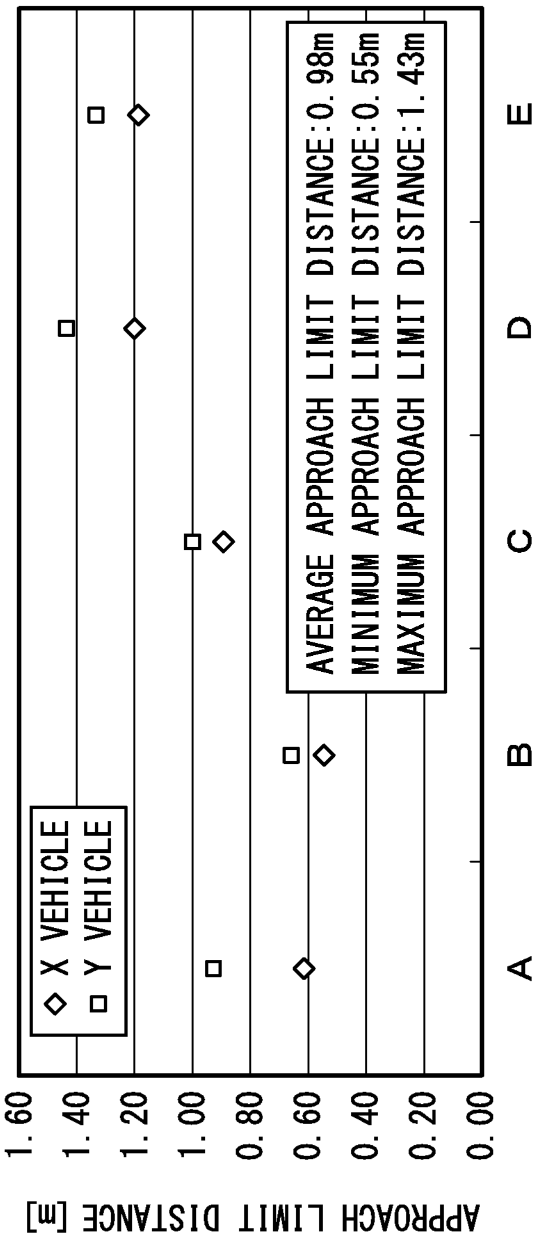
FIG. 3 is a diagram showing approach limit distances to a stationary motor vehicle according to the drivers.
Figure 4A:
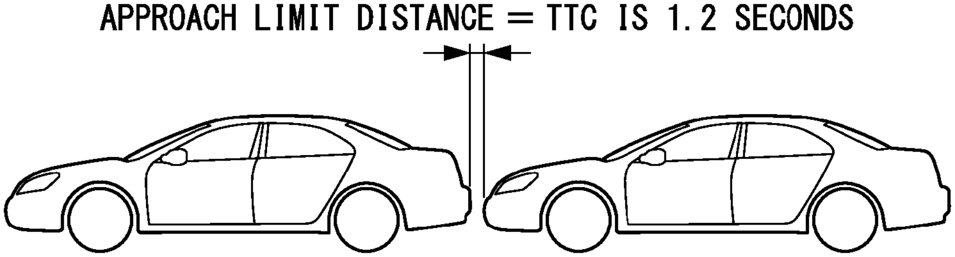
FIG. 4A is an explanatory diagram of an approach limit distance, showing an actual approach limit distance.
Figure 4B:
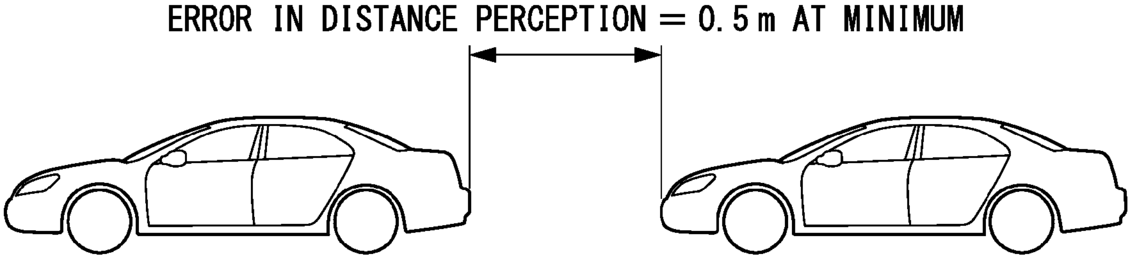
FIG. 4B is an explanatory diagram of an approach limit distance, showing an approach limit distance of the case where an error occurs in distance perception.

Here, the preset predetermined distance is a value decided by statistically taking into consideration an error in distance perception of the driver, which error occurs when the own vehicle and the preceding vehicle are at a short distance and also the vehicle speed of the own vehicle is extremely low (in a speed range of higher than 0 km/h and up to around 5 km/h). FIG. 3 shows the approach limit distance (the vertical axis) of the own vehicle to a stationary preceding vehicle (an obstacle). Symbols A to E (the horizontal axis) designate drivers with different driving experience. The minimum value of the approach limit distance is slightly greater than 0.5. The error in distance perception of a driver is a gap between the approach limit distance where TTC is 1.2 seconds, allowing no further approach (see FIG. 4A), and the distance that the driver thinks he cannot approach any further (see FIG. 4B). Even for a driver with extensive experience in driving such as the driver B, it is difficult to approach the stationary preceding vehicle closer than 0.5 m as described above.

For example, if the distance between the own vehicle and the preceding vehicle is 2 m at a speed of 5 km/h, the time to collision TTC is 1.44 seconds. The distance between the own vehicle and the preceding vehicle that is felt at this time by the driver is 2 m−0.5 m=1.5 m. Conversion of this distance to time to collision TTC results in 1.08 seconds. Namely, in the case of 5 km/h, the driver feels that the actual timing of alarm is late by 0.36 seconds. To compensate for this error, the time obtained by dividing the predetermined distance by the traveling speed is added to the reference alarm start time in the formula (1) as described above. Although the description has been for the case where the predetermined distance is set to 0.5 m, the distance is not limited to this value. Because there is a change in the error in distance perception depending on the shape, size, and the like of the own vehicle, an appropriate distance may be set according to the conditions of these shape, size, and the like of the own vehicle. Furthermore, because the degree of error in distance perception varies according to the driving experience, it may be configured so that an appropriate distance can be set depending on the driving experience of the drivers.

Figure 5:
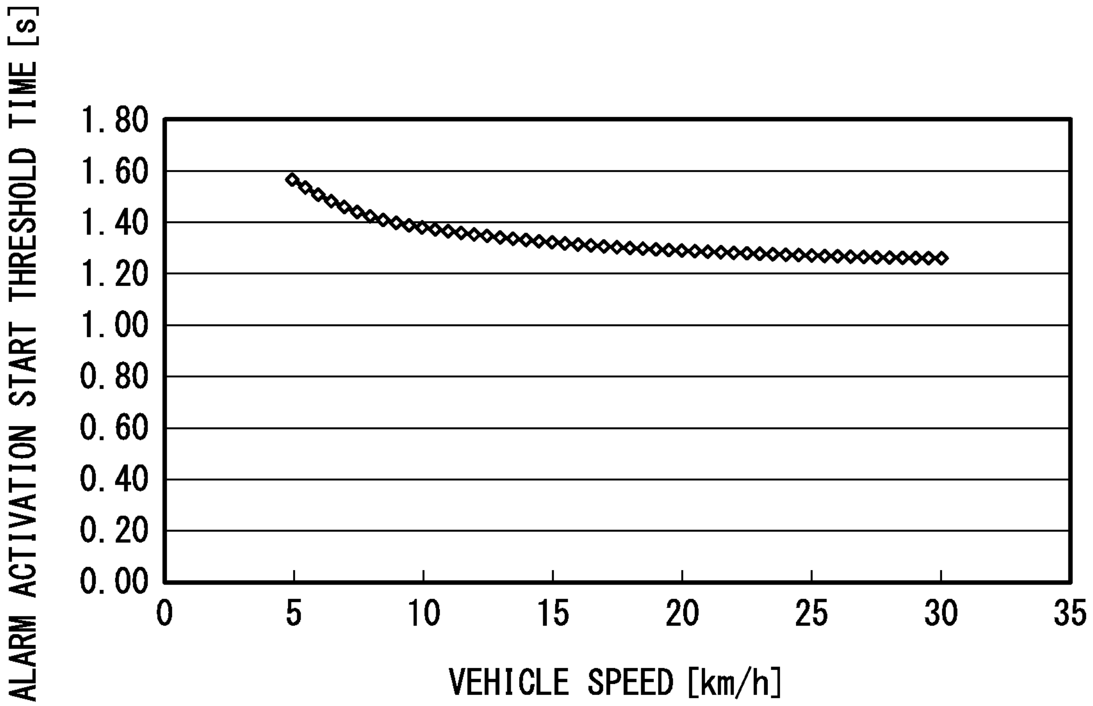
FIG. 5 is a graph showing a change in the alarm activation start threshold time with respect to the vehicle speed.

FIG. 5 is a graph where the vertical axis designates the alarm activation start threshold time, the horizontal axis designates the vehicle speed of the own vehicle (km/h), and the reference alarm start time is 1.2 seconds. As is seen from the graph, it is configured so that, in the region of low vehicle speed, the alarm activation start threshold time has a higher rate of increase, and hence, the timing of starting an alarm is earlier.

Next, in step S4, it is determined whether the time to collision TTC calculated by the TTC calculation portion 22 is longer than the alarm activation start threshold time or not. If the determination result is "No" (TTC>alarm activation start threshold time), the execution of this routine is temporarily terminated. On the other hand, if the determination result in step S4 is "Yes" (TTC≤alarm activation start threshold time), the process moves to step S5 to raise an alarm, and then the execution of this routine is temporarily terminated.

Therefore, according to the aforementioned embodiment, the alarm timing decision portion is used to add the value of the preset predetermined distance divided by the traveling speed to the preset reference alarm start time, to thereby find an alarm activation start threshold time. As a result, compared with the case where the speed of the own vehicle is high, it is possible to make the timing of activating an alarm the earlier as the speed of the own vehicle is the lower. Therefore, at the proper timing in accordance with the error in distance perception of the driver, it is possible to start activating an alarm, to thereby improve the merchantability.

Next is a description of a drive control apparatus according to a second embodiment of the present invention.

The drive control apparatus according to this embodiment is one in which the decision of the alarm timing by time to collision TTC in the aforementioned first embodiment is replaced with the decision of the alarm timing by a distance to collision. Therefore, like parts are designated with like reference numerals, and will not be repetitiously explained.

Figure 6:
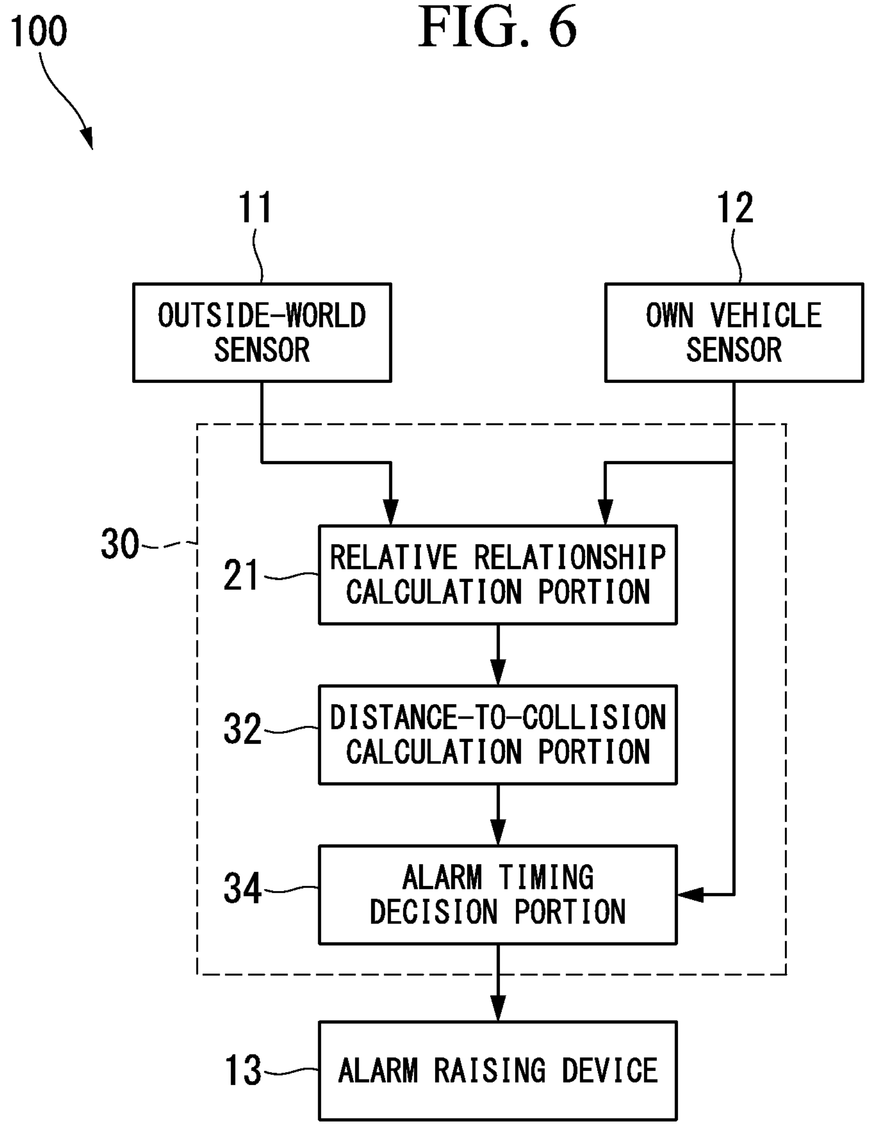
FIG. 6 is a block diagram according to a second embodiment of the present invention, which corresponds to FIG. 1.

As shown in FIG. 6, a drive control apparatus 100 according to this embodiment includes, for example: an outside-world sensor (an object detection portion) 11; an own vehicle sensor (a traveling speed detection portion) 12; an alarm raising device 13; and an electronic control device 30.

Based on the various information on the preceding vehicle that have been input from the outside-world sensor 11 and on the various information on the own vehicle that have been input from the own vehicle sensor 12, the electronic control device 30 calculates the time to when the own vehicle and the preceding vehicle are brought into contact with each other. Based on this result, the electronic control device 30 decides the timing of raising an alarm, and determines whether or not it is necessary to raise an alarm to the passenger(s) of the own vehicle. If having determined that it is necessary to raise an alarm, the electronic control device 30 outputs an alarm command to the alarm raising device 13.

The electronic control device 30 includes: a relative relationship calculation portion (a relative relationship calculation portion) 21; a distance-to-collision calculation portion (a distance-to-collision calculation portion) 32; and an alarm timing decision portion (an alarm portion) 34. Note that the relative relationship calculation portion 21 has the same configuration as that of the aforementioned first embodiment, and hence, will not be repetitiously explained here.

Based on the predicted courses of the own vehicle and the preceding vehicle and the relative distance and relative speed between the own vehicle and the preceding vehicle that have been input from the relative relationship calculation portion 21, the distance-to-collision calculation portion 32 determines whether the own vehicle and the preceding vehicle are likely to contact each other or not. If the vehicles are likely to contact each other, the distance-to-collision calculation portion 32 calculates a distance to contact (namely, a distance to collision), and outputs it to the alarm timing decision portion 34.

Based on the distance to collision that has been input from the distance-to-collision calculation portion 32, on the vehicle speed of the own vehicle that has been input from the own vehicle sensor 12, and on a reference alarm start distance, the alarm timing decision portion 34 decides the timing of raising an alarm, and outputs it to the alarm raising device 13.

Figure 7:
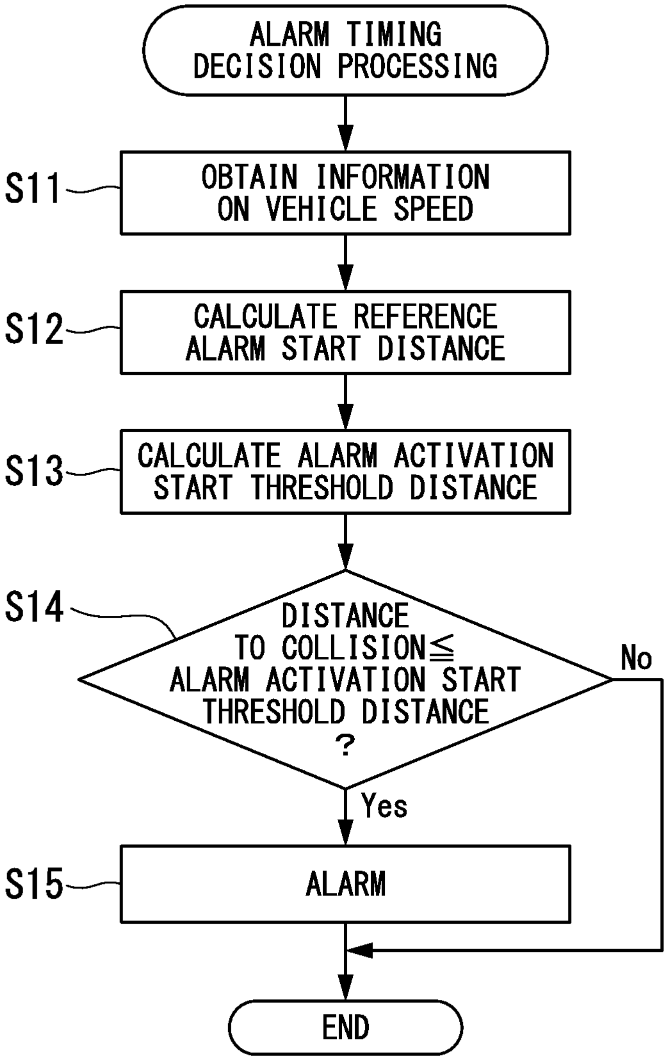
FIG. 7 is a flow chart according to the second embodiment of the present invention, which corresponds to FIG. 2.

Next is a description of the alarm timing decision processing performed by the alarm timing decision portion 34 for deciding the timing of raising an alarm, with reference to the flow chart of FIG. 7.

Firstly, in step S11, the information on the vehicle speed is obtained from the own vehicle sensor.

Next, in step S12, based on the aforementioned vehicle speed and on the preset reference time for an alarm (for example, approximately 1.2 seconds), a reference alarm start distance, which is a distance that the own vehicle moves during the reference time, is calculated.

Next, in step S13, an alarm activation start threshold distance is calculated based on the information on the vehicle speed and on the information on the reference alarm start distance. To be more specific, a preset predetermined distance of 0.5 (m) is added to the reference alarm start distance to calculate the alarm activation start threshold distance, as shown in formula (2) below.

$$\text{Alarm Activation Start Threshold Distance} = \text{Reference Alarm Start Distance} + \text{Predetermined Distance} \quad (2)$$

The preset predetermined distance is, similarly to the case of the first embodiment, a value decided by statistically taking into consideration an error in distance perception of the driver, which error occurs when the own vehicle and the preceding vehicle are at a short distance and also the vehicle speed of the own vehicle is extremely low as described above. Because there is a change in the error in distance perception depending on the shape, size, and the like of the own vehicle, an appropriate distance may be set according to the conditions of these shape, size, and the like of the own vehicle. Furthermore, because the degree of error in distance perception varies according to the driving experience, it may be configured so that an appropriate distance can be set depending on the driving experience of the drivers.

Next, in step S14, it is determined whether the distance to collision calculated by the distance-to-collision calculation portion 32 is longer than the alarm activation start threshold distance or not. If the determination result is "No" (distance to collision>alarm activation start threshold distance), the execution of this routine is temporarily terminated. On the other hand, if the determination result in step S14 is "Yes" (distance to collision≤alarm activation start threshold distance), the process moves to step S15 to raise an alarm, and then the execution of this routine is temporarily terminated.

Therefore, according to the second embodiment, the lower the traveling speed of the own vehicle is, the longer the reference alarm start distance is. Furthermore, a predetermined distance, which is a minimum value of the error in distance perception of the driver, is added to the reference alarm start distance to find an alarm activation start threshold distance. Consequently, even in the case where an error is likely to occur in distance perception of the driver with the traveling speed of the own vehicle being low and also the distance to collision being extremely short, it is possible to make the alarm activation start threshold distance longer by the predetermined distance. Therefore, at the proper timing in accordance with the error in distance perception of the driver, it is possible to activate an alarm, to thereby improve the merchantability.

Next is a description of a drive control apparatus according to a third embodiment of the present invention.

The drive control apparatus according to this embodiment is one in which "traveling speed" in the formula (1) of the first embodiment is replaced with "relative speed." Therefore, reference is made to FIG. 1, and repetitious explanation will be omitted.

The drive control apparatus according to this embodiment includes: an outside-world sensor 11; an own vehicle sensor 12; an alarm raising device 13; and an electronic control device 20.

The electronic control device 20 includes: a relative relationship calculation portion (a relative speed detection portion) 21; a TTC calculation portion (a time-to-collision calculation portion) 22; and an alarm timing decision portion (an alarm portion) 24.

Based on the information on the preceding vehicle (position, speed, direction of travel, and size) that has been input from the outside-world sensor 11 and on the information on the own vehicle (position, speed, and direction of travel) that has been input from the own vehicle sensor 12, the relative relationship calculation portion 21 predicts the courses of the own vehicle and the preceding vehicle, and also calculates the relative distance and relative speed between the own vehicle and the preceding vehicle. The relative relationship calculation portion 21 then outputs the results to the TTC calculation portion 22.

Based on the predicted courses of the own vehicle and the preceding vehicle and the relative distance and relative speed between the own vehicle and the preceding vehicle that have been input from the relative relationship calculation portion 21, the TTC calculation portion 22 determines whether the own vehicle and the preceding vehicle are likely to contact each other or not. If the vehicles are likely to contact each other, the TTC calculation portion 22 calculates the time to collision TTC, and outputs the information on the time to collision TTC and the relative speed between the own vehicle and the preceding vehicle to the alarm timing decision portion 24.

Based on the time to collision TTC and relative speed that have been input from the TTC calculation portion 22 and on the preset reference alarm start time, the alarm timing decision portion 24 decides the timing of raising an alarm, and outputs it to the alarm raising device 13.

Figure 8:
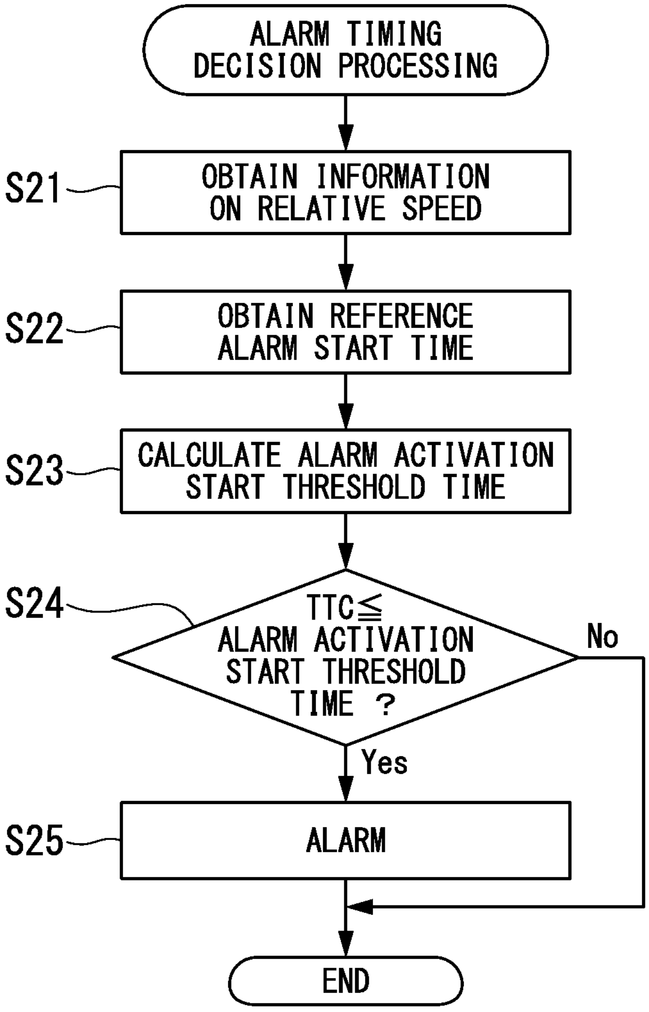
FIG. 8 is a flow chart according to a third embodiment of the present invention, which corresponds to FIG. 2.

Next is a description of the alarm timing decision processing according to the third embodiment, which is performed by the alarm timing decision portion 24, with reference to the flow chart of FIG. 8.

Firstly, in step S21, the information on the relative speed between the own vehicle and the preceding vehicle is obtained from the TTC calculation portion 22. It may be configured so that the information on the relative speed is obtained from the relative relationship calculation portion 21.

Next, in step S22, the information on the reference alarm start time (for example, approximately 1.2 seconds) that is previously stored in a storage device such as memory (not shown in the figure) is read and obtained. Similarly to the reference alarm start time described in the first embodiment, this reference alarm start time is a reference time for calculating the alarm activation start threshold time, which is a threshold value of the time to collision TTC.

Next, in step S23, alarm activation start threshold time is calculated based on the information on the relative speed and on the information on the reference alarm start time. To be more specific, a value (s) obtained by dividing a preset predetermined distance (m) (for example, 0.5 m) by a relative speed (m/s) is added to the reference alarm start time to calculate the alarm activation start threshold time, as shown in formula (3) below.

Alarm Activation Start Threshold Time=Reference Alarm Start Time+Predetermined Distance/Relative Speed (3)

Here, the preset predetermined distance is a value decided by statistically taking into consideration an error in distance perception of the driver, which error occurs when the own vehicle and the preceding vehicle are at a short distance and also the relative speed between the own vehicle and the preceding vehicle is extremely low (in a speed range of higher than 0 km/h and up to around 5 km/h). The error in distance perception of the driver is large in the case where the relative speed between the own vehicle and the preceding vehicle is extremely low, similarly to the case where the vehicle speed is extremely low in the first and second embodiments.

In step S24, it is determined whether the time to collision TTC calculated by the TTC calculation portion 22 is longer than the alarm activation start threshold time or not. If the determination result is "No" (TTC>alarm activation start threshold time), the execution of this routine is temporarily terminated. On the other hand, if the determination result in step S24 is "Yes" (TTC≤alarm activation start threshold time), the process moves to step S25 to raise an alarm, and then the execution of this routine is temporarily terminated.

Therefore, according to the third embodiment, even in the case where the traveling own vehicle is becoming closer to the preceding vehicle that is traveling especially at the same speed as that of the own vehicle, it is possible to activate an alarm at the proper timing in accordance with the error in distance perception of the driver.

Note that the present invention is not limited to the aforementioned embodiments. Design modifications can be made in the case where these modifications do not fall under the changes of gist of the invention.

In the first embodiment and the second embodiment, description has been for the case where formula (1) or formula (2) is used for the whole of the vehicle speed region to calculate the alarm activation start threshold time or the alarm activation start threshold distance. However, the design is not limited to this. With an extremely low vehicle speed region where the vehicle speed is especially low being preset, it may be configured so that the alarm activation start threshold time or the alarm activation start threshold distance is used to decide the alarm timing only when the vehicle speed from the own vehicle sensor 12 is determined to have entered the extremely low region. Similar design is also applicable to the case of the relative speed in the third embodiment. With an extremely low speed region where the vehicle speed is especially low being preset, it may be configured so that the alarm activation start threshold time is used to decide the alarm timing only when the relative speed calculated by the relative relationship calculation portion 21 is determined to have entered the extremely low speed region. In these cases, in the higher speed region than the extremely low speed region, the reference alarm start time may be used as the alarm activation start threshold time, and the reference alarm start distance may be used as the alarm activation start threshold distance.

In the aforementioned embodiments, description has been for the case where the possibility for the preceding vehicle to collide against the own vehicle is determined However, the determination target is not limited to the preceding vehicle so long as it has the possibility of colliding against the own vehicle. For example, it may be an information sign, a pedestrian, or the like.

Furthermore, in the aforementioned embodiments, if the target whose collision possibility is to be determined is a large vehicle such as a truck, the driver has an oppressive feeling, resulting in a larger error in distance perception. Consequently, if a determination is made whether the target is a comparatively large-sized obstacle such as a large vehicle based on the detection result from the outside-world sensor 11, with a determination result that the target is a large vehicle, then the aforementioned predetermined distance may be replaced with a longer distance for large vehicles.

In the second embodiment, description has been for the case where the distance with which the own vehicle moves the reference alarm start distance in the predetermined time (approximately 1.2 seconds), namely, the speed of the own vehicle is proportional to the reference alarm start distance. However, design is not limited to this. It may be set by use of a map or the like so that, as is the case with the change in the alarm activation start threshold time of the graph shown in FIG. 5, the lower the speed is, the higher the increase rate of the reference alarm start distance is.

Furthermore, there are cases where, when the traveling speed or the relative speed is close to 0 km/h, the alarm activation start threshold time is too long. Therefore, at speeds equal to or less than a predetermined traveling speed or a predetermined relative speed, a fixed value may be added to the reference alarm start time.

INDUSTRIAL APPLICABILITY

According to the drive control apparatus of the present invention, it is possible to activate an alarm at the proper timing in accordance with the error in distance perception of the driver, to thereby improve the merchantability.

DESCRIPTION OF THE REFERENCE SYMBOLS

1, 100: drive control apparatus
11: outside-world sensor (object detection portion)
12: own vehicle sensor (traveling speed detection portion)
13: alarm raising device
20, 30: electronic control device
21: relative relationship calculation portion (relative speed detection portion)
22: TTC calculation portion (time-to-collision calculation portion)
24, 34: alarm timing decision portion (alarm portion)
32: distance-to-collision calculation portion

The invention claimed is:

1. A drive control apparatus, comprising:

a traveling speed detection portion that detects a traveling speed of an own vehicle;

an object detection portion that detects an object around an own vehicle and obtains an object detection result;

a time-to-collision calculation portion that calculates time to when the object and the own vehicle collide against each other based on the traveling speed and the object detection result; and an alarm portion that starts an alarm based on the time to collision, wherein the alarm portion:

obtains reference alarm start time that is preset as a reference value for starting the alarm;

obtains a preset predetermined distance which is a minimum value of an error in distance perception of a driver;

adds time obtained by dividing the preset predetermined distance by the traveling speed to the reference alarm start time to find an alarm activation start threshold time; and the alarm is started based on the alarm activation start threshold time and on the time to collision, wherein the alarm activation start threshold time is increased so that the alarm is started at an earlier time, and wherein the preset predetermined distance is a difference between an approach limit distance where time to collision is the reference alarm start time and a distance at which the driver perceives that the driver cannot approach any further.

2. The drive control apparatus according to claim 1, wherein only at an extremely low vehicle speed, the alarm portion starts the alarm based on the alarm activation start threshold time.

3. A drive control apparatus, comprising:

a traveling speed detection portion that detects a traveling speed of an own vehicle;

an object detection portion that detects an object around an own vehicle and obtains an object detection result;

a distance-to-collision calculation portion that calculates a distance for the object and the own vehicle to collide against each other based on the traveling speed and the object detection result; and an alarm portion that starts an alarm based on the distance to collision, wherein the alarm portion:

obtains a reference alarm start distance that is preset as a reference value for starting the alarm;

obtains a preset predetermined distance which is a minimum value of an error in distance perception of a driver;

adds the predetermined distance to the reference alarm start distance to find an alarm activation start threshold distance; and the alarm is started based on the alarm activation start threshold distance and on the distance to collision, wherein the alarm activation start threshold time is increased so that the alarm is started at an earlier time, wherein the preset predetermined distance is a difference between an approach limit distance where distance is the reference alarm start distance and a distance at which the driver perceives that the driver cannot approach any further.

4. The drive control apparatus according to claim 3, wherein only at an extremely low vehicle speed, the alarm portion starts the alarm based on the alarm activation start threshold distance.

5. A drive control apparatus, comprising:

a traveling speed detection portion that detects a traveling speed of an own vehicle;

an object detection portion that detects an object around an own vehicle and obtains an object detection result;

a relative speed detection portion that detects a relative speed between an own vehicle and an object;

a time-to-collision calculation portion that calculates time to when the object and the own vehicle collide against each other based on the traveling speed and the object detection result; and an alarm portion that starts an alarm based on the time to collision, wherein the alarm portion:

obtains reference alarm start time that is preset as a reference value for starting the alarm;

obtains a preset predetermined distance which is a minimum value of an error in distance perception of a driver;

adds time obtained by dividing the predetermined distance by a relative speed between the own vehicle and the object to the reference alarm start time to find alarm activation start threshold time; and the alarm is started based on the alarm activation start threshold time and on the time to collision, wherein the alarm activation start threshold time is increased so that the alarm is started at an earlier time, wherein the preset predetermined distance is a difference between an approach limit distance where time to collision is the reference alarm start time and a distance at which the driver perceives that the driver cannot approach any further.

6. The drive control apparatus according to claim 5, wherein only when the relative speed is extremely low, the alarm portion starts the alarm based on the alarm activation start threshold time.

7. The drive control apparatus according to claim 2, wherein the extremely low relative speed is less than or equal to 5 km/h.

8. The drive control apparatus according to claim 4, wherein the extremely low relative speed is less than or equal to 5 km/h.

9. The drive control apparatus according to claim 6, wherein the extremely low relative speed is less than or equal to 5 km/h.

10. The drive control apparatus according to claim 1, wherein the alarm portion starts the alarm when it is determined that the time to when the object and the own vehicle collide against each is less than or equal to the alarm activation start threshold time.

11. The drive control apparatus according to claim 3, wherein the alarm portion starts the alarm when it is determined that the time to when the object and the own vehicle collide against each is less than or equal to the alarm activation start threshold time.

12. The drive control apparatus according to claim 5, wherein the alarm portion starts the alarm when it is determined that the time to when the object and the own vehicle collide against each is less than or equal to the alarm activation start threshold time.

* * * * *